Aug. 4, 1970  N. R. BELOPITOV  3,523,171
METHOD OF AND APPARATUS FOR THE SPARK-DISCHARGE
DEPOSITION OF CONDUCTIVE MATERIALS ON
A CONDUCTIVE SURFACE
Filed Jan. 21, 1969  4 Sheets-Sheet 1

INVENTOR.
NIKOLA R. BELOPITOV
BY
Karl F. Ross
ATTORNEY

INVENTOR.
NICOLA R. BELOPITOV
BY
Karl F. Ross
ATTORNEY

INVENTOR.
NIKOLA R. BELOPITOV
BY
Karl J. Ross
ATTORNEY

United States Patent Office 3,523,171
Patented Aug. 4, 1970

3,523,171
METHOD OF AND APPARATUS FOR THE SPARK-DISCHARGE DEPOSITION OF CONDUCTIVE MATERIALS ON A CONDUCTIVE SURFACE
Nikola R. Belopitov, Sofia, Bulgaria, assignor to Nautshno-Izsledovatelski i Proektno-Konstruktorski Institut po Elektrotechnitscheska Promishlenost, Sofia, Bulgaria, Research Institut of the People's Republic of Bulgaria
Continuation-in-part of application Ser. No. 494,069, Oct. 8, 1965. This application Jan. 21, 1969, Ser. No. 792,620
Int. Cl. B23k 9/04
U.S. Cl. 219—76
10 Claims

ABSTRACT OF THE DISCLOSURE

A method of and an apparatus for the coating of a conductive substrate with conductive material in which the coating electrode is formed as a brush with bristles extending in the direction of the workpiece. The brush, which is preferably rotated or oscillated to swing successive rows of bristles into positions of closest approach to the workpiece, may be carried by an oscillation-damped arm. The substrate or workpiece is resiliently supported at a continuous tension band or upon a yieldable table and a discharge is generated between the workpiece and the tool so that the discharge, cooperating with rotation or movement of the tool in contact with the workpiece, is the sole source of vibration or flutter of the workpiece. The discharge serves to carry portions of the electrode-bristle material into contact with the workpiece.

---

The present application is a continuation-in-part of my application Ser. No. 494,069 filed Oct. 8, 1965 (now Pat. No. 3,446,932).

My present invention relates to a method of and an apparatus for the spark-discharge deposition of metal and other conductive materials onto conductive surfaces and, more particularly, to a method of an apparatus for producing a coating of mixed materials upon the surface of a metallic body.

In the above-identified copending application, which represents an improvement of the subject matter disclosed in my U.S. Pat. 3,028,478 issued Apr. 3, 1962 and entitled "Method and Apparatus for Reducing Contact Noises in Electrical Devices," I have described a system for the spark-discharge deposition of noble metals, hard metals and hard-facing materials and other metals onto conductive surfaces, and especially less noble, soft or other substrates to which it is desired to bond the coating material.

In the copending application it has been pointed out that electric-discharge coating methods current heretofore were disadvantageous for various technological reasons. In such systems, the tool was an electrode which was mechanically or electromagnetically vibrated into and out of contact with the workpiece. Thus, careful control of the vibrating means was necessary to ensure that the vibration stroke was substantially constant and that the positions of furthest spacing and closest approach were reproducible. When the prior-art systems used lateral vibration, precise control of the interelectrode distances was necessary.

In general, therefore, the earlier systems required expensive apparatus which often was unsatisfactory.

It is, therefore, an important object of the instant invention to provide an improved method of depositing metals and metallic materials, especially materials of high electrical conductivity and low corrosivity as well as hard-facing materials and the like upon conductive surfaces in such manner that the substances are strongly adherent to the substrate and have high wear resistance.

A further object of this invention is to provide a method of firmly bonding a metallic coating material to a substrate along limited portions thereof without the disadvantages affecting other coating methods, and especially without the need for complex control devices for regulating interelectrode distances and without complex vibrating mechanisms, etc.

Yet a further object of this invention is to provide a method of and an apparatus for the spark-discharge coating of metallic substrates, and especially the deposition of highly conductive more noble metals upon less noble metals whereby the coated substrate can be used as a contact element in switching devices and the like.

Still another object of the instant invention is the provision of a method of forming, in situ and reproducibly, coatings of metal alloys having two or more component metals on a surface of the substrate with improved bonding to the latter.

A further object of this invention is to provide an improved method of an apparatus for the formation of metallic alloys of a plurality of metals on a workpiece surface.

According to my earlier application, the externally supplied high-frequency vibrations theretofore required between the anodic metal-depositing tool or electrode and the cathodic metal-receiving body, are eliminated and vibration is autoinduced as a result of the interaction between a rotating disk electrode and the workpiece which is yieldably supported at a pair of locations on opposite sides of the region at which the disk contacts the substrate. The anode can thus be constituted as a thin disk to bear circumferentially against the substrate while the latter is constituted as a band or is supported by a band or other flexible body. The disk osculates the substrate (i.e. contact of second or higher order at a cylinder tangential to a plane, a cylinder contacting a cylindrical surface with a different radius, etc.), so that in the direction of displacement of at least one of the juxtaposed surfaces (i.e. the anode surface or substrate surface), a progressively widening gap extends from the contact line and is adapted to sustain a spark discharge upon application of an impulsive electrode current across the rotating disk of coating material and the band-like substrate.

I have also pointed out in that application that the substrate can be formed by a plurality of electrode members (rods) successively engageable with the disk which deposits one or more coating materials upon the substrate.

An important feature of the system of my earlier application is that the sole requirement which must be controlled for uniform application of the coating material is the pressure at which the disk is urged into contact with the substrate. Thus, the rotating disk is preferably mounted on a lever system having weights for biasing the disk against the substrate. The disk is, consequently, mounted pendulously with weights at the upper end of the disk-carrying arm, the weights having adjustable centers of gravity.

It has been observed that the use of a disk carrying a multiplicity of electrode elements or angularly spaced electrode portions adapted to be brought succcssively into contact with the substrate, gives rise to a vibration or "flutter" a the discharge interface of a frequency often above that developed by conventional spark-discharge deposition systems and effective in a manner not unlike the vibration effect in systems of that type. Thus, if 30 electrode members are provided along the circumference of the disk, and the disk speed is 6,000 revolutions/minute, electrode contact will take place at a 180,000 times per minute corresponding to a vibration frequency of about 3,000 cycles/second. The vibration phenomena is, of course, also observable when the disk has a smooth surface as a result of the transfer by electric discharge of electrode materials from the disk-shaped anode to the cathodic workpiece. While applicant does not wish to be bound by any theory in this regard, it would appear that an important reason for the improved results obtainable with the present system, by comparison with earlier spark-deposition arrangements, is that the temporary fusion of the rotating disk to the flexibly supported substrate draws the substrate slightly along with the disk, whereupon the momentary bond is broken and the substrate snaps back to vibrate with a frequency determined in part by its resilience, in part by the effective mass of the disk, in part by the relative velocity of the disk and the substrate, in part by the effectiveness of the oscillation-damping arrangement acting upon the arm, and probably primarily by the frequency of the applied electrical pulses.

I have now found that similar techniques can be used most effectively in the formation of alloy coatings upon the surface of a substrate, and especially coatings which are difficult to compound otherwise and which can have proportions of the alloy ingredients more variable than has been possible heretofore. This can be accomplished by replacing the disks with a multiplicity of flexible electrode members, hereinafter referred to as 'bristles" and of rod or wire-like construction so that the coating electrodes may have the configuration of a wire brush. The bristles or electrode members of this rotatable electrode wire may be composed of various metals which collectively form an alloy on the surface of the substrate. When it is desired to change the composition of the alloy, one or more of the electrode members can be replaced with electrode members of a different composition. Consequently, a binary alloy of, for example, copper and silver may be applied with a brush electrode having 5,000 bristles and will yield alloy coating with a copper/silver proportion substantially identical to the proportion of copper bristles to silver bristles. Similarly, ternary alloys and alloys of a multiplicity of members can be formed.

It has aso been found to be desirable to support the brush electrode on a pendulous arm of the character previously described, although effective coating has been achieved with a hand-held apparatus in which the brush-like tool electrode is urged into contact with the substrate while discharges are applied across the bristles of the brush and the workpiece.

The above and other objects, features and advantages of the present invention will become more readily apparent from the following description, reference being made to the accompanying drawing in which.

Figure 1:
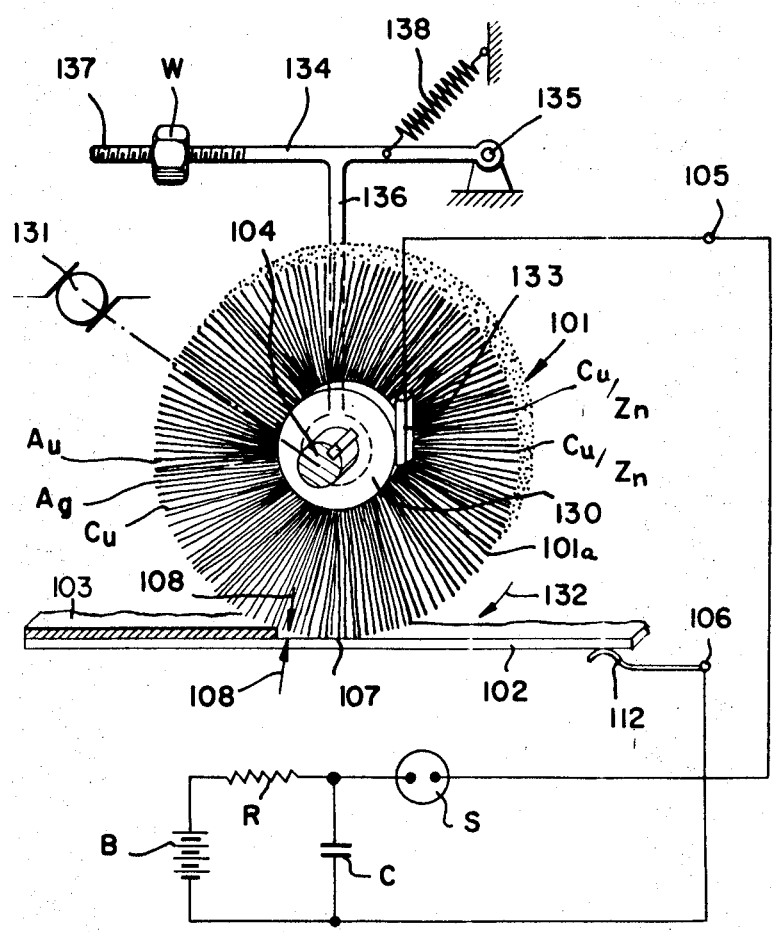
FIG. 1 is a diagrammatic vertical perspective view, partly cross-section, of an apparatus embodying the principles of the present invention.

Referring now to FIG. 1 of the drawing, it will be seen that the anode of the spark-deposition device is constituted as a rotary brush 101 having a hub 130 from which a multplicity of bristles 101*a* extend generally radially. These bristles are here constituted as metal wires of gold (Au), silver (Ag), copper (Cu), bronze and brass (Cu/Sn and Cu/Zn), the metals being deposited in an alloy layer 103 upon a substrate 102 so that the layer includes all of these substances which mutually fuse together and bond to the substrate in a structure not unlike that obtained when the mteals, in similar proportions, are compounded in a melt cast onto the substrate surface.

The brush 101 has is hub 130 keyed to a shaft 104 of a motor or other driving means represented diagrammatically at 131. The wire bristles of the brush may, of course, be composed of other metals, e.g. platinum, of high electrical conductivity or of hard-facing materials such as tungsten, hard nickel-chromium steel or the like.

The brush 101 is driven in the direction of the arrow 132 (clockwise in FIG. 1) and is tangential to the continuous band 102, constituting the substrate which is to be coated with the layer 103. As pointed out in my co-pending application Ser. No. 494,069, in spite of the fact that the brush electrode 101 is tangential to the substrate 102 and is urged into more or less constant contact therewith at the osculating point 107, the application of an impulsive electric current across the substrate 102 and the brush electrode 101 will cause aspark discharge to develop between the bristles at the region indicated generally by the arrows 108 as the periphery of the brush rotates away from the substrate whereupon the coating material constituted by the electrode members or bristles is carried by the discharge onto the substrate 102 or remains thereon after incipient fusion to form the deposit 103.

While any impulsive source (e.g. that shown in my aforementioned patent) can be employed to energize the system, I prefer to use a capacitor C connected in series with a charging resistance R across the direct current source represented by the battery B. The capacitance of condenser C and the charging voltage of the source B are so selected that the condenser C can charge to a level above the break-down potential of the gap S and generate a discharge as repersented at 108. The switching element precludes premature draining of the condenser and is provided between the charging source B, C, R and the positive and negative terminals 105 and 106 of the apparatus whereby, at each discharge, the brush 101 is rendered anodic and the workpiece of substrate 102 is rendered cathodic. The switching device can be the break-down element illustrated or an electronic switch element (e.g. a solid-state controlled rectifier or SCR device or a thyratron) triggered by a pulse applied to the control element.

When the capacitor C is fully charged, the gap S will break down to apply the full condenser charge impulsively across the brush electrode 101 and the substrate 102 to produce the deposition spark. The frequency of the applied pulses may be of the order discussed in the aforementioned Pat. No. 3,028,478 and is, of course, determined by the battery potential B, the ohmic value of resistor R and the capacitance of condenser C. However, during each applied pulse, a discharge will be generated between numerous bristles proximal to the substrate and the total discharge at 108 will be the sum of the individual sparks. The impulsive nature of these discharges and the interaction between the bristles and the substrate, as the electrode material fuses to the latter, induce a vibration of the workpiece relative to the brush of a substantially higher frequency than the applied frequency. If the bristles have a diameter of 2 to 3 mm., for example, and 1,000 bristles are provided on the brush, which can rotate at, say, 6,000 revolutions/min., the vibration imparted to the substrate will be approximately $60 \times 10^{-5}$/min. or about $10^5$ vibrations/sec.

Figure 3:
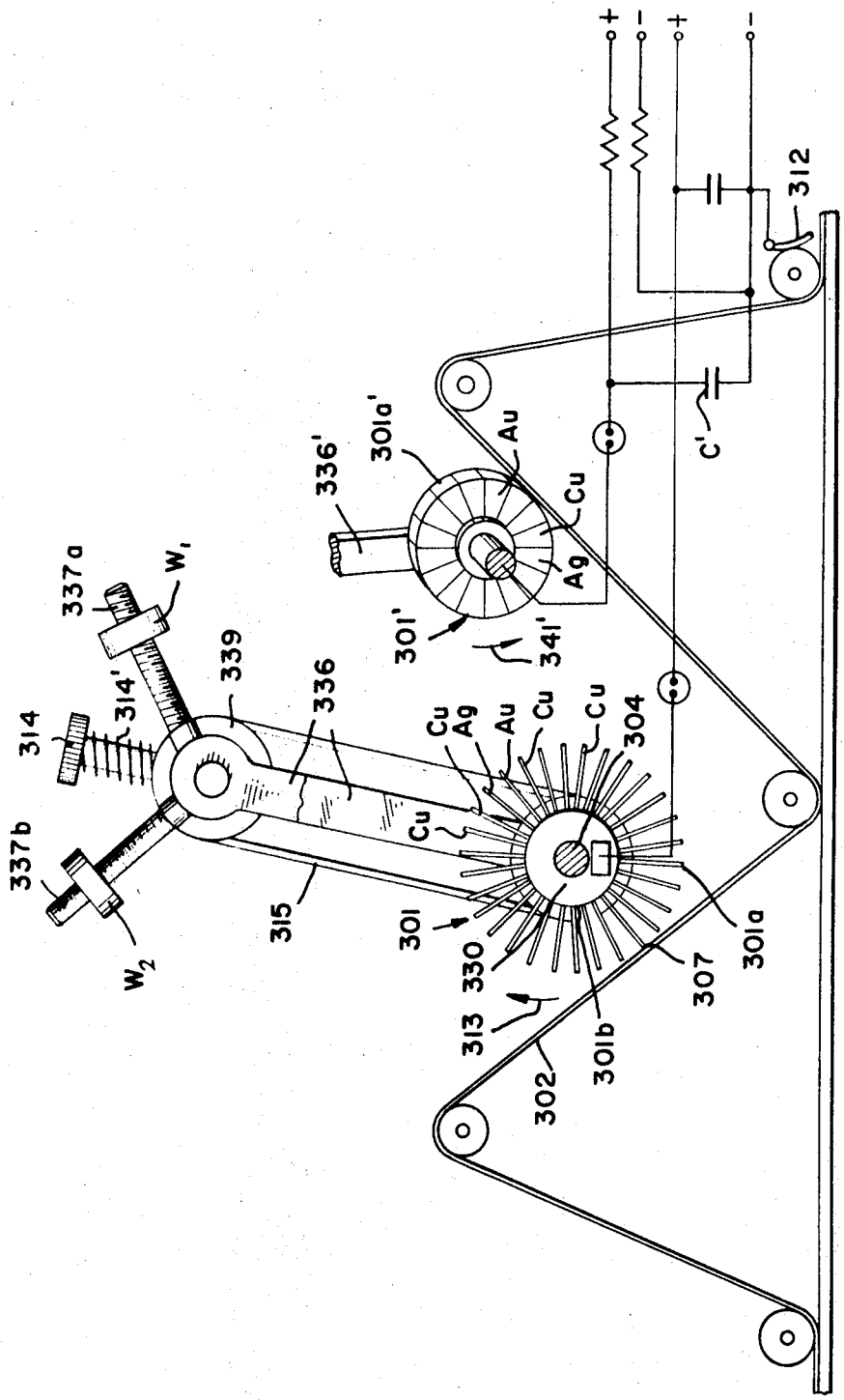
FIG. 3 is a view similar to FIG. 2 of yet another apparatus using modified electrodes.
Figure 4:
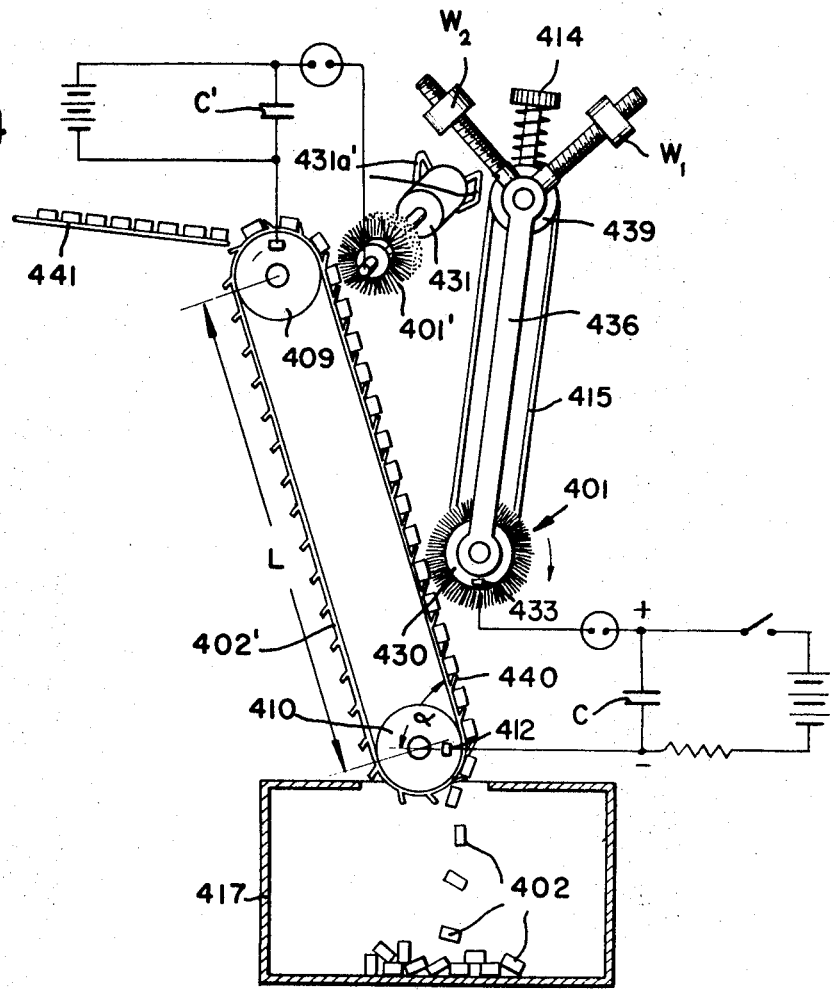
FIG. 4 is a vertical elevational view in diagrammatic form of an apparatus capable of coating a series of individual members according to this invention.

The brush electrode 101 is connected to its terminal 105 by a wiper 133 which engages the hub 130 so that the latter forms a slip ring. A wiper 112 can be employed to connect the terminal 106 with the substrate 102. Preferably, the substrate is resiliently suspended between spaced-apart supports as shown in FIGS. 2–4.

Adjusting means is provided for selectively varying the pressure with which the brush 101 bears against the substrate, this pressure determining the point at which the discharge occurs and, to a large measure, the uniformity of the coating. The means for urging the brush electrode 101 against the band 102 can include a lever arrangement with, for example, a lever arm 134 fulcrumed at 135 to a support structure and carrying a depending arm 136 on which the shaft 104 of the brush electrode 101 is journaled. The pressure of the brush electrode 101 against the band 102 can be increased or decreased by adjusting the position of a weight W along the threaded shank 137 of the arm 134, the weight W being consituted as a nut engaging the shank. A spring 138 can be provided to balance all or part of the weight of the brush electrode 101 so that the latter swings substantially pendularly about the fulcrum 135 and the absolute contact pressure may be set by the weight regardless of the mass of the brush electrode 101.

Figure 2:
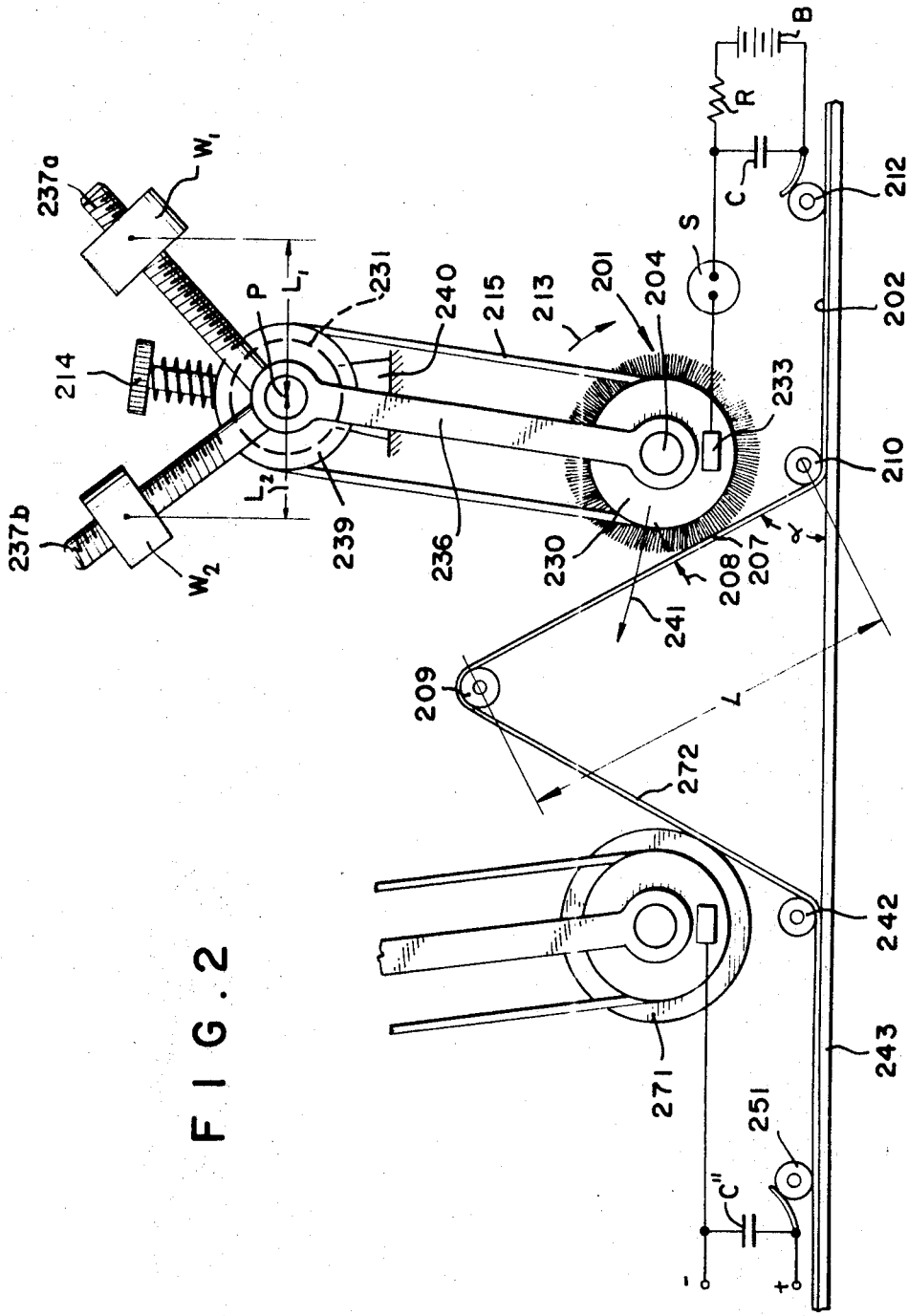
FIG. 2 is a diagrammatic elevational view of another apparatus of the type contemplated by the present invention.

In FIG. 2, I show a construction of an apparatus in accordance with the present invention in which the brush electrode 201 is constituted as described in connection with FIG. 1 and deposits an alloy layer upon a connection band 202. An electric motor 231 drives the brush electrode 201 via a driving pulley 239 and a belt 215 and is journaled in a pendulous arm 236. The motor is carried by a support 240 diagrammatically illustrated in FIG. 2 which swingably carries the arm 236 and allows it to pivote about the axis P of the driving pulley 239.

At the lower end of the arm 236 the shaft 204 of the brush electrode 201 is journaled, the hub of the brush electrode being secured to the driven pulley 230 which is conductive and is engaged by a wiper 233. The latter applies the anode potential of capacitor C to the brush. The capacitor C is energized via a charging circuit R, B, S in the manner previously described.

The arm 236 carries a pair of shanks 237a and 237b angularly offset from one another about the axis P of the pulley 239 and located at opposite sides thereof The shanks 237a and 237b are threaded to receive respective weights $W_1$, $W_2$ for adjustment of the effective moment arms $L_1$ and $L_2$, respectively. The moment of force tending to swing the arm 236 in the clockwise direction is thus $W_1 \times L_1$ whereas the force moment tending to swing the arm in the clockwise sense is essentially the product of the weight of the brush electrode 201 and the interaxial distance between the pulleys 239 and 230 plus $(W_2 \times L_2)$.

It is evident, therefore, that it is possible to adjust the resultant force tending to urge the brush electrode 201 against the resisting element constituted by the continuous substrate 202 merely by proper modification of the positions of the weights $W_1$ and $W_2$ to vary their moment arms $L_1$ and $L_2$ respectively.

Upon rotation of the electrode brush 201 in the clockwise sense (arrow 213), the electrode brush 201 is urged radially in the direction of arrow 241 by the larger force moment of weight $W_1$ to bring the electrode brush to bear against the point 207 with the desired pressure.

The band 202 is guided upwardly at an angle α to the horizontal over a distance L by a pair of tensioning rollers 209, 210 while further guide rollers 212, 251 and 242 are provided along the table 243 for advancing the band. The roller 212 is connected with the capacitor C at its negative terminals.

Under the unbalanced moment of force of weight $W_1$, the electrode brush 201 bears tangentially upon the band 202 at the point 207 and, upon the application of an electrical impulse across the electrode brush 201 and the band 202 from the capacitor C, a discharge develops between the bristles of the brush and the band at 208 to carry material from the individual electrode bristles on the band.

It has been found that no further device is necessary for applying pressure to the electrode brush and that the same pressure can be used for various diameters of the latter. The band 202 tensioned between the rollers 209 and 210 is somewhat elastic and is found to vibrate with a frequency which, as has been noted, is a function of the rate of rotation of the brush, the sum of individual bristle electrodes, the elastic modulus of the band and the spark discharge frequency. The extent of the deposit is controlled by varying the capacity-charging voltage, the charging current, the resistance of the charging circuit, the capacitance of condenser C, the frequency of the discharge, the speed of advance of the band 202 and/or the peripheral speed of the brush electrode 201.

In order to stabilize the brush electrode 201, I provide a spring-loaded oscillation damper 214 or other similar device. The brush electrode 201 tends to become lighter with erosion of the electrode material constituted by the bristles and its transferral to the workpiece 202. The device consequently allows a corresponding decrease in the effective length $L_2$ of lever arm 237b and an increase of the effective length $L_1$ of lever arm 237a as the axle 204 of the brush electrode moves in the direction of arrow 241 by an amount corresponding to the decrease in the effective diameter of the brush electrode; this ensures that the pressure of the brush electrode 201 against the band 202 at point 207 remains substantially constant. The width of the deposit applied to the band is normally determined by the width of the brush electrode 201 and, if desired, can be increased by a system of the type shown, for example, in FIG. 5 which allows the brush electrode to shift axially. Other systems for increasing the width of the deposit have been described in my copending application mentioned earlier.

As also noted in this latter application, a similar structural arrangement can be used for electropolishing the deposited layer by, for example, spark-discharge removal of peaks and projections of the deposited layer. Also, polishing can be effected by energizing a disk with a weak reverse polarity. Thus, in FIG. 2 I have shown a disk 271 which is held against the substrate 202 at its stretch 272 by a balancing weight mechanism similar to that shown at 236-239. The energizing source makes use of a smaller capacitor C" charged by a network corresponding to the one illustrated at R and B, which is dischargeable across the disk 271 and a band 202 to smooth the previously deposited layer at a location forwardly along the transport path and which renders the disk 271 cathodic with respect to the substrate although the potential applied will be less than that developed at the deposition state.

In the system of FIG. 3, a two-stage deposition arrangements acts upon the substrate 302. Here, an arm 336 carries a driving pulley 339 operated by a motor as described in connection with FIG. 2. In this arrangement, however, the belt 315 rotates a pulley 330 which is keyed to an electrode 301 by a shaft 304 in the clockwise sense (arrow 313). The anodic electrode 301 is here constituted of a multiplicity of angularly spaced rod-shaped electrodes 301a which are anchored in a hub 301b. As has been described previously, the rods may be composed of different metals (e.g. silver, gold or copper) to form an alloy coating upon the substrate 302.

The electrode 301 is biased against the substrate 302 via the weights $W_1$ and $W_2$ threaded onto the lever arms or shanks 337a and 337b of the pendulous arm 336. The rods 301a thus successively engage the workpiece at 307 where the band is substantially tangential to the circle defined by the outer tips of the rods 301a. As these rods move away from the band 302, a spark is generated between the successive electrode members consonant with the discharge of capacitor C. Again, a damping mechanism 314, with a spring 314', is provided to stabilize the pendulous system 301a, 336, etc. Each rod 301, as it effects deposition of its electrode material on the band, causes a temporary transverse displacement of the band which is effectively vibrated at a frequency $$F = \frac{R \times N}{60}$$

where F is the vibrating frequency in cycles/sec., R is the rate of rotation of the electrode in revolutions/min. and N is the number of electrode rods carried by the disk.

In order to increase the coating rate, I may provide a plurality of parallel, mutually insulated electrode assemblies having respectve radial members in side-by-side relationship athwart a single band or a plurality of transversely spaced bands, the several spark-deposition assemblies being energized by respective discharge circuits.

A preliminary alloy coating of the substrate 302 can be carried out by an electrode disk 301', ahead of the rod assembly 301a and pendulously carried in an arm 336' biased in the direction of arrow 341' by weights corresponding to those shown at $W_1$ and $W_2$. Here, however, the disk 301' is made up of a plurality of sectors 301a' composed of different metals so that a coating is applied which is composed of a mixture of these metals. A capacitor C', charged in the usual manner, is anodically connected to the disk 301' and cathodically connected with the substrate 302 by a wiper 312 in contact with a roller serving to displace the substrate 302.

In FIG. 4, I have shown a system for coating a succession of workpiece members 402 as they are carried by a belt 402' of yieldable material past a brush electrode 401 constituted as described in connection with FIGS. 1 and 2. The belt 402' is provided with support pockets 440 which receive the individual bodies 402 from a feed device 441 or from the hand of an operator and carry the workpieces 402 past the brush electrode 401 whose bristles are constituted of different coating metals.

A belt 415 connects the pulley 430 of the brush electrode 401 with a driving pulley 439 at the upper end of an arm 436 swingably carrying the brush electrode 401. Pulley 439 is rotated by a motor as previously described while a pair of weights $W_1$ and $W_2$ and a damping arrangement 414 are also provided to function as has already been discussed.

The belt 402' passes over a pair of conveyor rollers 409, 410 disposed at the desired angle α to the horizontal and spaced apart by the length L discussed with reference to FIG. 2. The belt 402' is composed of a conductive material so that a wiper 412 can deliver the negative polarity of the capacitor C to the workpieces 402. A further wiper 433 delivers the positive potential to the brush electrode 401. The speed of the roller 409, 410 and the rate of which the workpieces 402 move past the brush electrode 401 determines the transverse oscillation rate of the workpieces at the discharge. After being coated, the workpieces 402 fall into a bin 417.

If a preliminary coating of the workpieces 402 is desired, I may use the hand-held unit shown in FIG. 4, this unit including a motor 431 on the output shaft of which is provided a wire brush 401' of the type described in connection with the electrode brushes 101, 201, 401. A capacitor C' is provided to produce the electric discharges while handles 431a' are mounted on the motor to provide hand grips for the operator. In this case, the arms of the operator form a pendulous support by means of which the brush electrode 401' is urged against the workpieces.

Figure 5:
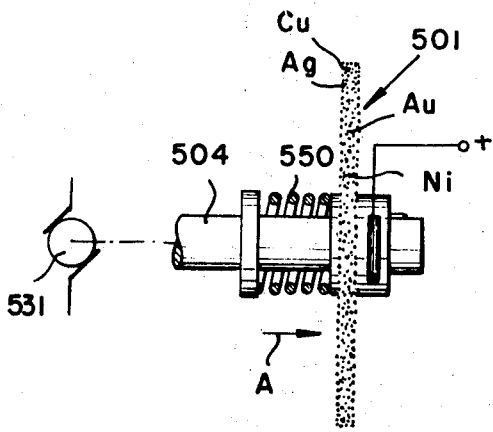
FIG. 5 is an elevational view of a coating brush according to this invention.

A modified system is seen in FIG. 5 in which the brush electrode 501 is mounted on a shaft 504 and is driven by a motor 531. A spring 550 urges the brush 501 in the direction of arrow A to allow at least limited axial movement of the brush. As has been described in my abovementioned copending application, the flanks of this brush can be used to coat the workpiece or the brush can be applied tangentially to the latter.

I claim:
1. A method of applying a conductive coating to a conductive substrate, comprising the steps of:
rotating a brush electrode having a multiplicity of flexible bristles of different conductive materials with said bristles in contact with a surface of said workpiece;
applying intermittent electrical pulses across said electrode and said workpiece to form discharges between the workpiece surface and successive bristles of said electrode to carry respective materials from said bristles onto said surface and form a substantially continuous layer thereon consisting of the combined materials while displacing said workpiece past said electrode and urging said electrode against said workpiece surface.

2. The method defined in claim 1, further comprising the step of resiliently supporting said workpiece whereby the generation of said intermittent electrical pulses induces vibration thereof.

3. The method defined in claim 2 wherein said electrode is rendered anodic during each of said pulses with said workpiece being rendered cathodic.

4. An apparatus for the coating of a workpiece comprising:
a circular brush electrode having a multiplicity of angularly offset electrode bristles of different conductive materials;
means for rotating said electrode in contact with a workpiece;
biasing means for urging said brush electrode against said workpiece;
circuit means for intermittently applying an electric potential across said electrode and said workpiece with said electrode relatively anodic and said workpiece relatively cathodic to effect a spark discharge between said electrode and said workpiece proximal to the region at which said bristles contact said workpiece whereby said discharge carries material from said bristles successively onto said workpiece to form a substantially continuous deposit thereon consisting of a combination of said materials; and
means for displacing said workpiece past said electrode during deposition of said materials thereon.

5. The apparatus defined in claim 4, further comprising means for elastically suspending said workpiece on opposite sides of said region whereby said spark discharges induce vibration of said workpiece.

6. The apparatus defined in claim 4, further comprising a fixed support and a pendulous arm having one end pivotal on said support about a pivot axis and another end rotatably carrying said brush electrode, said biasing means including a pair of shanks fixed to said arm at said one end and angularly offset to each other about said pivot axis and a pair of weights lying on opposite sides of a vertical plane passing through said pivot axis and each carried on a respective one of said arms.

7. The apparatus defined in claim 6, further comprising means for controlling the pressure with which said electrode bears upon said workpiece including formations on said shanks engageable with said weights to releasably hold same on said shank.

8. The apparatus defined in claim 7 wherein said formations are threads engaging said weights.

9. The apparatus defined in claim 6, further comprising oscillation damping means limiting oscillation of the electrode about said pivot axis.

10. The apparatus defined in claim 9 wherein said oscillation damping means includes a spring bearing on said one end of said arm.

References Cited

UNITED STATES PATENTS

| | | | |
|---|---|---|---|
| 1,460,137 | 6/1923 | Myers | 219—76 |
| 2,909,639 | 10/1959 | Procopio et al. | 219—69 |
| 3,277,267 | 10/1966 | Blaszkowski | 219—76 |

JOSEPH V. TRUHE, Primary Examiner

W. D. BROOKS, Assistant Examiner

U.S. Cl. X.R.

219—137